(12) United States Patent
Xie et al.

(10) Patent No.: US 9,462,169 B2
(45) Date of Patent: Oct. 4, 2016

(54) SHOOTING METHOD, APPARATUS, AND TERMINAL

(71) Applicant: Huawei Technologies Co., Ltd., Shenzhen, Guangdong (CN)

(72) Inventors: Qingpeng Xie, Shenzhen (CN); Lei Zhang, Beijing (CN); Shanfu Li, Shenzhen (CN); Jun Yao, Shenzhen (CN); Shan Gao, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 14/574,002

(22) Filed: Dec. 17, 2014

(65) Prior Publication Data

US 2015/0189138 A1    Jul. 2, 2015

Related U.S. Application Data

(63) Continuation of application No. PCT/CN2014/081739, filed on Jul. 7, 2014.

(30) Foreign Application Priority Data

Dec. 31, 2013  (CN) .......................... 2013 1 0753985

(51) Int. Cl.
*H04N 5/225*   (2006.01)
*H04N 5/232*   (2006.01)
*H04N 5/235*   (2006.01)

(52) U.S. Cl.
CPC .......... *H04N 5/2256* (2013.01); *H04N 5/2354* (2013.01); *H04N 5/2355* (2013.01); *H04N 5/2356* (2013.01); *H04N 5/23222* (2013.01); *H04N 5/23293* (2013.01)

(58) Field of Classification Search
CPC .......... H04N 5/2256; H04N 5/23293; H04N 5/2354
USPC ............................... 348/370, 333.01, 333.02
See application file for complete search history.

(56) References Cited

U.S. PATENT DOCUMENTS

2004/0239799 A1    12/2004  Suzuki et al.
2005/0094015 A1*   5/2005   Kuruma ............. H04N 5/23293
                                                         348/333.01

(Continued)

FOREIGN PATENT DOCUMENTS

CN         101697563 A    4/2010
CN         103152523 A    6/2013

(Continued)

OTHER PUBLICATIONS

"set.a.light 3D Studio—3D Photo Studio Simulation", www.elixxier.com, Sep. 1, 2012, 14 pages, XP055217289.

*Primary Examiner* — Nhan T Tran (57) ABSTRACT

Embodiments of the present invention disclose a shooting method, an apparatus, and a terminal. The method includes: after it is detected that a camera is started, instructing a display screen facing a shooting person to display a preview image; obtaining a preset lighting parameter; controlling a display screen facing a shot target to provide lighting by using the preset lighting parameter; and shooting an image according to a shooting instruction. In the embodiments of the present invention, a display screen may be used as an auxiliary light source, and the display screen is controlled to provide lighting by using a preset lighting parameter, so that the quality of an image shot by a camera in a low light condition is improved.

15 Claims, 5 Drawing Sheets

(56) References Cited

U.S. PATENT DOCUMENTS

| | | | |
|---|---|---|---|
| 2007/0229695 A1* | 10/2007 | Kato | G03B 13/02 |
| | | | 348/333.12 |
| 2009/0256814 A1 | 10/2009 | Chung et al. | |
| 2009/0322889 A1 | 12/2009 | Kujawa et al. | |
| 2010/0194961 A1 | 8/2010 | Patel | |
| 2013/0050233 A1* | 2/2013 | Hirsch | H04N 1/00127 |
| | | | 345/589 |
| 2014/0285699 A1* | 9/2014 | Kato | H04N 5/23293 |
| | | | 348/333.12 |

FOREIGN PATENT DOCUMENTS

| | | |
|---|---|---|
| CN | 103220421 A | 7/2013 |
| EP | 1 650 706 A2 | 4/2006 |
| EP | 2 109 298 A1 | 10/2009 |
| EP | 2 667 587 A1 | 11/2013 |
| JP | 2001251553 A | 9/2001 |
| JP | 2003348603 A | 12/2003 |
| JP | 2004180245 A | 6/2004 |
| JP | 2004304517 A | 10/2004 |
| JP | 2004349843 A | 12/2004 |
| WO | WO 2004/054239 A1 | 6/2004 |

\* cited by examiner

SHOOTING METHOD, APPARATUS, AND TERMINAL

CROSS-REFERENCE TO RELATED APPLICATIONS

This application is a continuation of International Application No. PCT/CN2014/081739, filed on Jul. 7, 2014, which claims priority to Chinese Patent Application No. 201310753985.0, filed on Dec. 31, 2013, both of which are hereby incorporated by reference in their entireties.

TECHNICAL FIELD

The present invention relates to shooting technology, and in particular, to a shooting method, an apparatus, and a terminal.

BACKGROUND

Many terminals (such as a mobile phone, a camera, and a PDA) are already equipped with two cameras (a front-facing camera and a rear-facing camera), and some terminals are even equipped with two screens. Generally, in most use scenarios, the rear-facing camera faces opposite to a user, the front-facing camera faces the user, and the user may use the front-facing camera for selfie.

The rear-facing camera has one or more flashes to provide an auxiliary light source in a low light condition to facilitate photographing or video recording (photographing and/or video recording may be collectively referred to as shooting). A front-facing camera generally faces a user in most use scenarios, and a flash is likely to hurt human eyes; therefore, generally, the front-facing camera is not equipped with a flash. As a result, the quality of an image shot by using the front-facing camera in a low light condition may be undesirable.

SUMMARY

In view of this, an objective of embodiments of the present invention is to provide a shooting method, an apparatus, and a terminal, so as to solve the foregoing problem.

To achieve the foregoing objective, the embodiments of the present invention provide the following technical solutions:

According to a first aspect of the embodiments of the present invention, a shooting method is provided, including:

after it is detected that a camera is started, instructing a display screen facing a shooting person to display a preview image;

obtaining a preset lighting parameter;

controlling a display screen facing a shot target to provide lighting by using the preset lighting parameter; and shooting an image according to a shooting instruction.

With reference to the first aspect, in a first possible implementation, the obtaining a preset lighting parameter includes: obtaining the preset lighting parameter after it is detected that the camera is started.

With reference to the first aspect, in a second possible implementation, the obtaining a preset lighting parameter includes: obtaining the preset lighting parameter when shooting the image according to the shooting instruction.

With reference to any one of the first aspect to the second possible implementation of the first aspect, in a third possible implementation, the display screen facing the shooting person and the display screen facing the shot target are a same display screen, and the display screen includes a display area for displaying the preview image and a lighting area for providing lighting by using the preset lighting parameter.

With reference to any one of the first aspect to the third possible implementation of the first aspect, in a fourth possible implementation, the lighting parameter includes at least one of a backlight color value, a color temperature value, and a backlight brightness value.

With reference to any one of the first aspect to the fourth possible implementation of the first aspect, in a fifth possible implementation, the preview image includes at least one of a true image collected by the camera and a simulated image.

With reference to the fifth possible implementation of the first aspect, in a sixth possible implementation, the simulated image is a simulation of an image collected in a scenario in which the display screen provides lighting by using the preset lighting parameter.

With reference to the fifth possible implementation of the first aspect, in a seventh possible implementation, the simulated image is a simulation of an image collected in a scenario in which the display screen does not provide lighting by using the preset lighting parameter.

With reference to the fifth possible implementation of the first aspect, in an eighth possible implementation, the simulated image is an image obtained after lighting improvement processing is performed on the true image collected by the camera.

With reference to any one of the first aspect to the eighth possible implementation of the first aspect, in a ninth possible implementation, the obtaining a preset lighting parameter is performed after it is determined that ambient light brightness collected by a light sensor is less than a preset brightness threshold.

With reference to the ninth possible implementation of the first aspect, in a tenth possible implementation, before the obtaining a preset lighting parameter, the method further includes: setting the lighting parameter according to the collected ambient light brightness.

With reference to any one of the first aspect to the tenth possible implementation of the first aspect, in an eleventh possible implementation, the method further includes: when a distance between a shot person and the camera is shorter than a preset distance threshold, prohibiting a flash on a same side as the camera from flashing, where the flash on the same side as the camera refers to a flash whose light coverage range is consistent with a scene capturing range of the camera.

With reference to any one of the first aspect to the eleventh possible implementation of the first aspect, in a twelfth possible implementation, the method further includes: performing lighting improvement processing on the shot image.

With reference to the eighth possible implementation of the first aspect or the ninth possible implementation of the first aspect, in a thirteenth possible implementation, the lighting improvement processing includes at least one of the following: improving overall brightness of the image, enhancing an image contrast ratio, and image composition.

According to a second aspect of the embodiments of the present invention, a shooting apparatus is provided, including:

a display control unit, configured to: after it is detected that a camera is started, instruct a display screen facing a shooting person to display a preview image;

a lighting parameter obtaining unit, configured to obtain a preset lighting parameter;

a lighting control unit, configured to control a display screen facing a shot target to provide lighting by using the preset lighting parameter obtained by the lighting parameter obtaining unit; and a shooting unit, configured to shoot an image according to a shooting instruction.

With reference to the second aspect, in a first possible implementation, the display screen facing the shooting person and the display screen facing the shot target are a same display screen, and the display screen includes a display area and a lighting area; with respect to instructing the display screen facing a shooting person to display a preview image, the display control unit is specifically configured to control the display area to display the preview image; and with respect to controlling the display screen facing a shot target to provide lighting by using the preset lighting parameter obtained by the lighting parameter obtaining unit, the lighting control unit is specifically configured to control the lighting area to provide lighting by using the preset lighting parameter.

With reference to the second aspect, in a second possible implementation, with respect to instructing the display screen facing a shooting person to display a preview image, the display control unit is specifically configured to instruct the display screen facing the shooting person to display at least one of a true image collected by the camera and a simulated image.

With reference to the second possible implementation of the second aspect, in a third possible implementation, the shooting apparatus further includes: a first lighting improvement processing unit, configured to perform lighting improvement processing on the true image collected by the camera, where the simulated image is an image obtained after the first lighting improvement processing unit performs lighting improvement processing.

With reference to any one of the second aspect to the third possible implementation of the second aspect, in a fourth possible implementation, the lighting parameter obtaining unit obtains the preset lighting parameter after it is determined that ambient light brightness collected by a light sensor is less than a preset brightness threshold.

With reference to the second aspect or the fourth possible implementation of the second aspect, in a fifth possible implementation, the shooting apparatus further includes: a setting unit, configured to: before the lighting parameter obtaining unit obtains the preset lighting parameter, set the lighting parameter according to the ambient light brightness collected by the light sensor.

With reference to any one of the second aspect to the fifth possible implementation of the second aspect, in a sixth possible implementation, the shooting apparatus further includes: a prohibiting unit, configured to: when a distance between a shot person and the camera is shorter than a preset distance threshold, prohibit a flash on a same side as the camera from flashing, where the flash on the same side as the camera refers to a flash whose light coverage range is consistent with a scene capturing range of the camera.

With reference to any one of the second aspect to the sixth possible implementation of the second aspect, in a seventh possible implementation, the shooting apparatus further includes: a second lighting improvement processing unit, configured to perform lighting improvement processing on the shot image.

According to a third aspect of the embodiments of the present invention, a terminal is provided, at least including a display screen, a camera, and the shooting apparatus according to any one of the foregoing.

It can be seen that, in the embodiments of the present invention, a display screen may be used as an auxiliary light source, and the display screen is controlled to provide lighting by using a preset lighting parameter, so that the quality of an image shot by a camera in a low light condition is improved.

BRIEF DESCRIPTION OF THE DRAWINGS

To describe the technical solutions in the embodiments of the present invention more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

DETAILED DESCRIPTION

To make the objectives, technical solutions, and advantages of the embodiments of the present invention clearer, the following clearly describes the technical solutions in the embodiments of the present invention with reference to the accompanying drawings in the embodiments of the present invention. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

Figure 1:
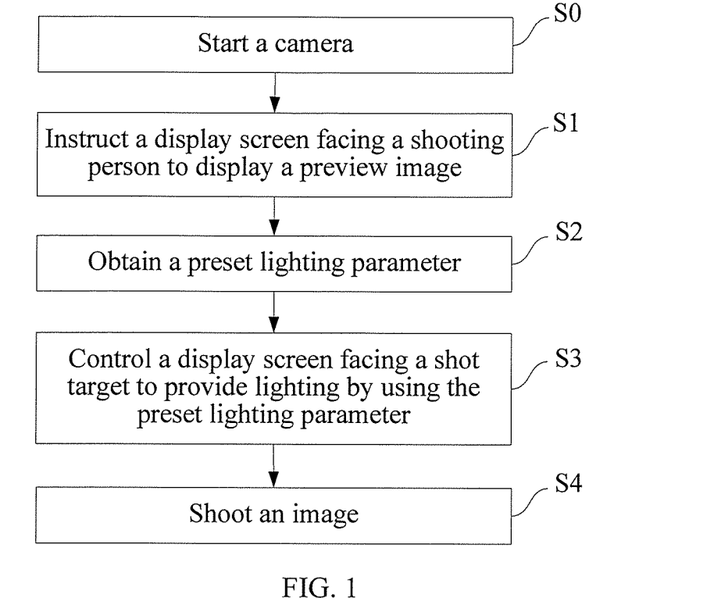
FIG. 1 is a flowchart of a shooting method according to an embodiment of the present invention.

Refer to FIG. 1, which is a flowchart of a shooting method according to the present invention. The method may at least include:

S0: Start a camera.

S1: After it is detected that the camera is started, instruct a display screen facing a shooting person to display a preview image.

The preview image is displayed until the following step S4 is performed.

After a camera is started, a conventional terminal also displays an image collected by the camera, in other words, the conventional terminal displays an image within an image capturing range of a lens of the camera.

In this embodiment, similar to the conventional terminal, the displayed preview image may be an image collected by the camera. In another embodiment of the present invention, the displayed preview image may not be limited to the image collected by the camera, which is to be introduced subsequently in this specification.

S2: Obtain a preset lighting parameter.

To be more specific, step S2 may be performed after it is detected that the camera is started, or may be performed when an image is shot according to a shooting instruction (the shooting instruction is given when a user presses a shutter).

Figure 2:
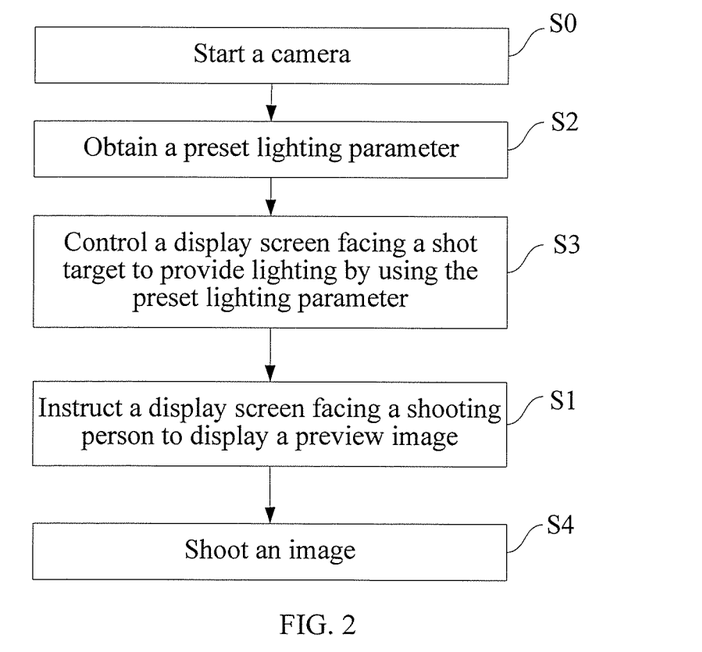
FIG. 2 is another flowchart of a shooting method according to an embodiment of the present invention.
Figure 3:
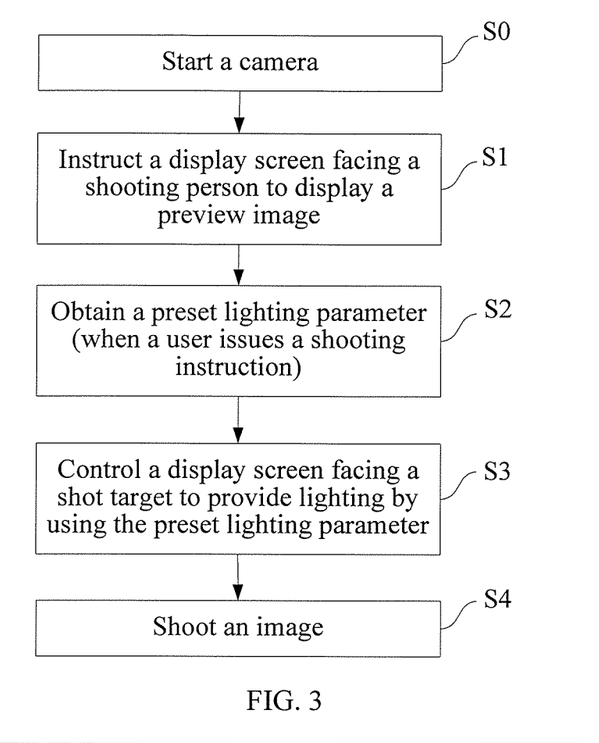
FIG. 3 is still another flowchart of a shooting method according to an embodiment of the present invention.

Therefore, referring to FIG. 2 and FIG. 3, a procedure of the shooting method shown in FIG. 1 may have two parallel specific solutions.

S3: Control a display screen facing a shot target to provide lighting by using the preset lighting parameter.

The display screen facing the shooting person and the display screen facing the shot target may be a same display screen, and may also be two independent display screens, which is to be described in detail subsequently in this specification.

Further, the lighting parameter may include at least one of a backlight color value, a color temperature value, and a backlight brightness value.

In another embodiment of the present invention, the lighting parameter may further include a projection angle, duration, and the like.

When setting the lighting parameter, a user may select a desirable backlight color (a color value), or use a system default backlight color (a color value), for example, white; and a specific color is not limited in the present invention. Apparently, the user may also select a desirable backlight brightness, color temperature, and the like, so as to produce an optimal lighting effect.

It should be noted that, similar to stage lighting design, any one or combination of a backlight color value, a color temperature value, a backlight brightness value, a projection angle, duration, and the like may be applied to produce a specific shading effect, such as a checkerboard light source effect, a light source effect in which the middle is bright and two sides are gradually dimmed, and a light source effect of scattered starlight.

Each combination of the foregoing may be regarded as a light source template provided to produce a special light source effect.

Values of parameters in the foregoing combinations may be saved in a terminal, so as to provide a special light source effect when a display screen is used to provide lighting.

S4: Shoot an image according to a shooting instruction.

To be more specific, shooting may include photographing or video recording; therefore, a shot image may include a picture or a video.

In this embodiment of the present invention, after it is detected that a camera is started, or a shooting instruction is received, a display screen may be used as an auxiliary light source of the camera, and the display screen provides lighting by using a preset lighting parameter, so that the quality of an image shot by the camera in a low light condition is improved.

Based on a procedure shown in FIG. 2, after it is detected that a camera is started, a display screen provides lighting by using a preset lighting parameter; therefore, an image collected by the camera is an image collected in a scenario in which the display screen provides lighting by using the preset lighting parameter.

Based on the procedure shown in FIG. 2, in another embodiment of the present invention, when a preview image is displayed, a true image collected by the camera may be directly displayed. Alternatively, for contrast, a display area of the display screen may be divided into a first display area and a second display area, where the true image collected by the camera is displayed in the first display area, and a simulated image is displayed in the second display area. For example, based on the procedure shown in FIG. 2, the simulated image is an image simulated in a scenario in which the display screen is not used to provide lighting.

Based on a procedure shown in FIG. 3, a display screen uses a preset lighting parameter to provide lighting after a shooting instruction is received; therefore, before the shooting instruction is received, an image collected by a camera is an image collected in a scenario in which the display screen does not provide lighting by using the preset lighting parameter.

Based on the procedure shown in FIG. 3, in another embodiment of the present invention, when the preview image is displayed in all the foregoing embodiments, a true image collected by the camera may be directly displayed. Alternatively, for contrast, a display area of the display screen may be divided into a first display area and a second display area, where the true image collected by the camera is displayed in the first display area, and a simulated image is displayed in the second display area.

However, in this embodiment, the true image is an image collected by the camera in a scenario in which the display screen does not provide lighting by using the preset lighting parameter, and the simulated image is a simulation of an image collected in a scenario in which the display screen provides lighting by using the preset lighting parameter.

In another embodiment of the present invention, no matter the method is based on the procedure shown in FIG. 2 or FIG. 3, the simulated image in all the foregoing embodiments may also be an image obtained after lighting improvement processing is performed on the true image collected by the camera.

Further, the lighting improvement processing may include at least one of the following:

improving overall brightness of the image, enhancing an image contrast ratio, and image composition.

Image composition may be performed by using a conventional image composition technology, for example, at least two pictures are taken during photographing, and the two pictures are combined into a picture of higher quality by performing processing such as HDR (High-Dynamic Range, high-dynamic range), red-eye effect elimination, light reflection effect elimination, defogging, and the like.

In addition, a frame of a bright color such as white or yellow, or another decorative background may be further added to a shot image to produce a different visual effect.

Moreover, in another embodiment of the present invention, the lighting parameter may be further displayed while the preview image is displayed, so that a user makes an adjustment.

In another embodiment of the present invention, the step of obtaining a preset lighting parameter (namely, step S2) in all the foregoing embodiments may be performed after it is determined that an ambient light brightness collected by a light sensor is less than a preset brightness threshold. A person skilled in the art may set the brightness threshold according to an actual need, or a user may set the brightness threshold, which is not described herein in detail.

Further, when the ambient light brightness is greater than or equal to the brightness threshold, the display screen may not be used to provide lighting (that is, the preset lighting parameter is not obtained). In this way, in this embodiment, it can be automatically determined, according to the ambient light brightness collected by the light sensor, whether the display screen is used to provide lighting.

Alternatively, in another embodiment of the present invention, in a case in which the camera is equipped with a flash, it may also be determined, according to the ambient light brightness collected by the light sensor, whether a flashing function of the flash is used. For example, when the ambient light brightness is less than the brightness threshold, the flashing function of the flash is used, and when the ambient light brightness is greater than or equal to the brightness threshold, the flashing function of the flash is not used.

In addition, in another embodiment of the present invention, the lighting parameter (for example, a backlight brightness) may also be set according to the collected ambient light brightness.

In another embodiment of the present invention, before step S3, the foregoing photographing method may further include the following steps:

when a distance between a shot person (particularly eyes of the shot person) and the camera is shorter than a preset distance threshold, prohibiting a flash on a same side as the camera from flashing, so as to reduce damage to human eyes (this embodiment is mainly applied to a selfie case). The "flash on a same side as the camera" may refer to a flash whose light coverage range is consistent with a scene capturing range of the camera.

To be more specific, when there are multiple flashes on the same side as the shooting camera, all the flashes may be prohibited from flashing, or some of the flashes may be prohibited from flashing.

In addition, a graphical interface may be further added, so that a user chooses whether to use the display screen as an auxiliary light source.

Figure 4:
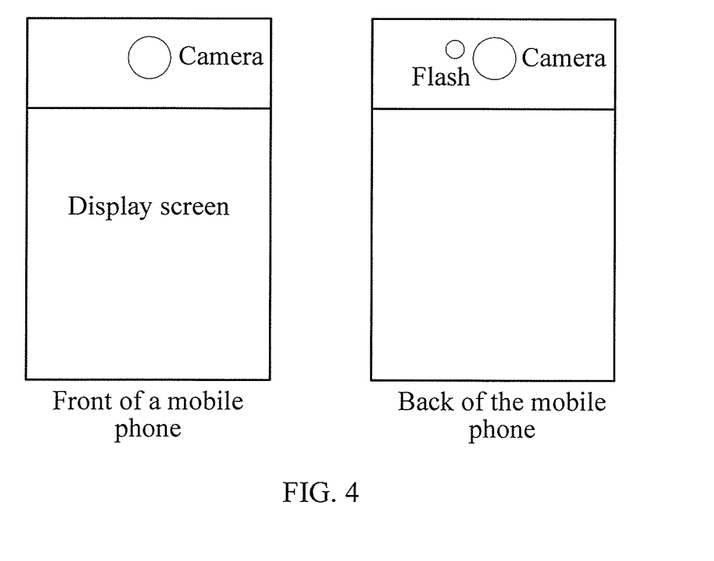
FIG. 4 is a schematic diagram of two cameras plus a single display screen according to an embodiment of the present invention.

The shooting method provided in all embodiments of the present invention is at least applicable to a terminal with two cameras (a front-facing camera and a rear-facing camera) plus a single display screen shown in FIG. 4. A terminal with a single display screen has only one display screen; therefore, when performing selfie, a user may use the single one display screen to provide lighting for a camera, and displays a preview image on the display screen. That is, in this embodiment, a display screen facing a shooting person and a display screen facing a shot target are a same display screen.

In this case, the display screen may be divided into a display area and a lighting area, where the display area may be used to display the preview image, and the lighting area may be used to provide lighting by using the foregoing preset lighting parameter.

Further, in another embodiment of the present invention, the display area may be further divided into a first display area and a second display area to separately display a true image collected by the camera and a simulated image.

Figure 5:
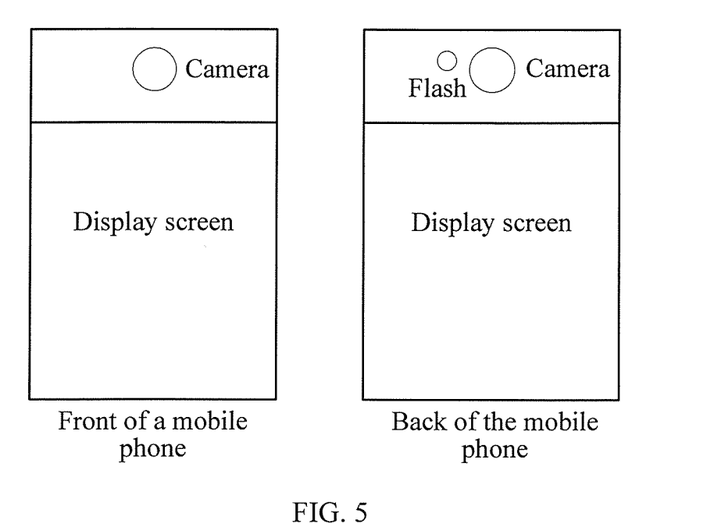
FIG. 5 is a schematic diagram of two cameras plus two display screens according to an embodiment of the present invention.
Figure 6:
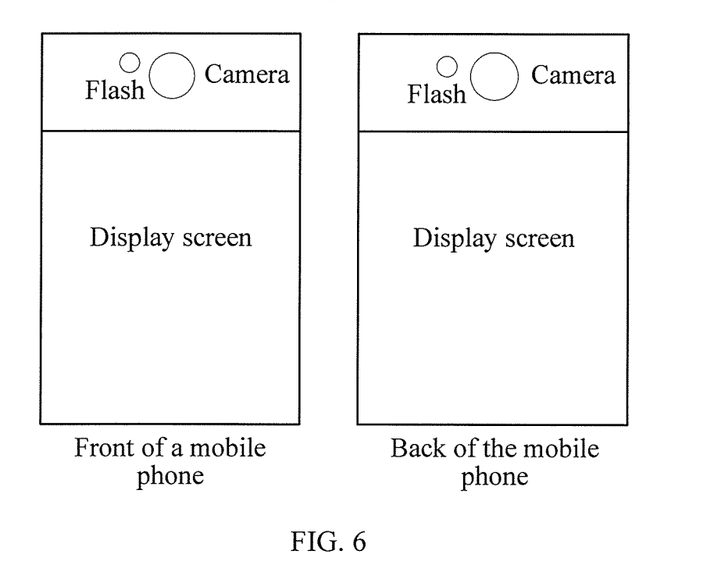
FIG. 6 is another schematic diagram of two cameras plus two display screens according to an embodiment of the present invention.

Besides, the shooting method provided in all embodiments of the present invention is further applicable to a terminal with two cameras plus two display screens shown in FIG. 5 or FIG. 6. During shooting, one display screen of the terminal with two display screens faces a shot object or person (the one display screen is referred to as a display screen facing a shot target), and the other display screen faces a user (the other display screen is referred to as a display screen facing a shooting person). In this scenario, the display screen facing a shooting person and the display screen facing a shot target are different display screens. In this way, the shooting method is not limited to selfie, and in a scenario such as macro photography, a display screen may also be used to provide lighting.

Apparently, during selfie by a terminal with two cameras plus two display screens, the display screen facing the shooting person and the display screen facing the shot target are still a same display screen. Similar to the foregoing, in this case, the display screen facing the shooting person and the shot target may be divided into a display area for displaying a preview image and a lighting area for providing lighting by using the preset lighting parameter.

Using a display screen as a lighting source of photographing has the following advantages:

Screen brightness is suitable for human eyes to watch and does not hurt human eyes.

Ina selfie/self-videoing scenario, a display screen is turned on (bright) and faces a human face, and a distance between the screen and the human face falls within a lighting range of the screen. In addition, despite the selfie/self-videoing scenario, because a preview image is to be displayed, the screen is also bright (at least one screen of a terminal with two screens is bright). The bright screen (or a partial area on the screen) may be used as a light source to facilitate shooting, thereby making it unnecessary to add another light source component and avoiding an increase in cost.

Lighting color and brightness of the display screen are controllable, and therefore light source options with different color and brightness are available for selection.

Improvement of display screen techniques has contributed to continuous improvement in display brightness, and therefore a display screen can be used as a high-quality light source. Moreover, the display screen tends to be transparent and flexible, thereby providing more features and options when used as a light source of photographing.

In another embodiment of the present invention, before or after step S1, a user may choose to enter a photographing mode or a video recording mode. In this way, after a shutter is pressed, the terminal may perform photographing or video-recording depending on the mode entered.

In another embodiment of the present invention, after step S4, the method may further include the following step:

returning to display a preview image.

In this step, the displayed preview image may be a shot image, or may be an image frame (generally the first image frame) in a shot picture/recorded video.

Figure 7:
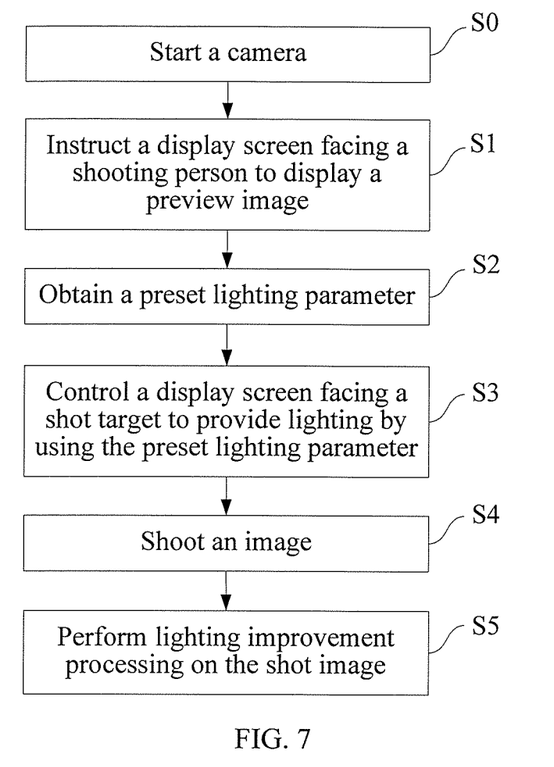
FIG. 7 is yet another flowchart of a shooting method according to an embodiment of the present invention.

In another embodiment of the present invention, referring to FIG. 7, after step S4, the method may further include the following step:

S5: Perform lighting improvement processing on the shot image.

To be more specific, the lighting improvement processing may include at least one of the following:

improving overall brightness of the image, enhancing an image contrast ratio, and image composition.

Image composition may be performed by using a conventional image composition technology, for example, at least two pictures are taken during photographing, and the two pictures are combined into a picture of higher quality by performing processing such as HDR (High-Dynamic Range, high-dynamic range), red-eye effect elimination, light reflection effect elimination, defogging, and the like.

In addition, a frame of a bright color such as white or yellow, or another decorative background may be further added to a shot image to produce a different visual effect.

Figure 8:
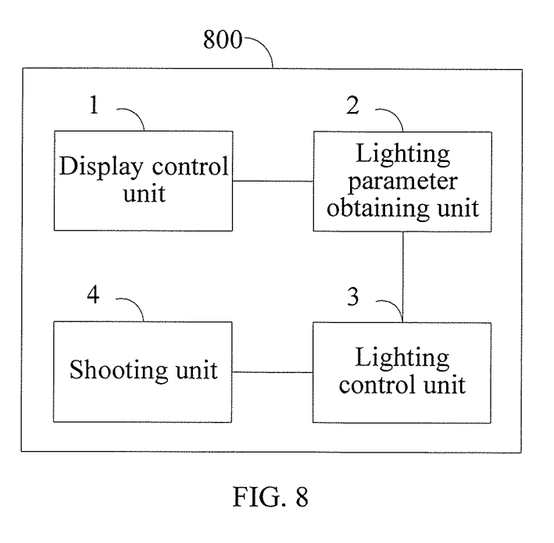
FIG. 8 is a schematic structural diagram of a shooting apparatus according to an embodiment of the present invention.

The embodiments of the present invention also claims protection for a shooting apparatus. As shown in FIG. 8, a shooting apparatus 800 may include:

a display control unit 1, configured to: after it is detected that a camera is started, instruct a display screen facing a shooting person to display a preview image;

a lighting parameter obtaining unit 2, configured to obtain a preset lighting parameter;

a lighting control unit 3, configured to control a display screen facing a shot target to provide lighting by using the preset lighting parameter obtained by the lighting parameter obtaining unit 2; and a shooting unit 4, configured to shoot an image according to a shooting instruction.

Refer to the foregoing description in this specification for related content, which is not described herein again.

In another embodiment of the present invention, the lighting parameter obtaining unit 2 obtains the preset lighting parameter after it is determined that ambient light brightness collected by a light sensor is less than a preset brightness threshold.

In another embodiment of the present invention, the apparatus in all the foregoing embodiments may further include: a setting unit, configured to: before the lighting parameter obtaining unit 2 obtains the preset lighting parameter, set the lighting parameter according to the ambient light brightness collected by the light sensor. Refer to the foregoing description in this specification for related content, which is not described herein again.

In a terminal with a single display screen, the display screen facing the shooting person and the display screen facing the shot target are a same display screen, and the display screen may include a display area and a lighting area.

Correspondingly, in another embodiment of the present invention, with respect to instructing the display screen facing a shooting person to display the preview image, the display control unit 1 in all the foregoing embodiments may be specifically configured to control the display area to display the preview image; and with respect to controlling the display screen facing a shot target to provide lighting by using the preset lighting parameter obtained by the lighting parameter obtaining unit 2, the lighting control unit 3 may be specifically configured to control the lighting area to provide lighting by using the preset lighting parameter.

Refer to the foregoing description in this specification for related content, which is not described herein again.

In another embodiment of the present invention, with respect to instructing the display screen facing a shooting person to display the preview image, the display control unit in all the foregoing embodiments is specifically configured to instruct the display screen facing the shooting person to display at least one of a true image collected by the camera and a simulated image.

Refer to the foregoing description in this specification for related content, which is not described herein again.

In another embodiment of the present invention, the apparatus in all the foregoing embodiments may further include:

a first lighting improvement processing unit, configured to perform lighting improvement processing on the true image collected by the camera, where the simulated image may be an image obtained after the first lighting improvement processing unit performs lighting improvement processing.

In another embodiment of the present invention, the apparatus in all the foregoing embodiments may further include: a prohibiting unit, configured to: when a distance between a shot person and the camera is shorter than a preset distance threshold, prohibit a flash on a same side as the camera from flashing, where the flash on the same side as the camera refers to a flash whose light coverage range is consistent with a scene capturing range of the camera.

Figure 9:
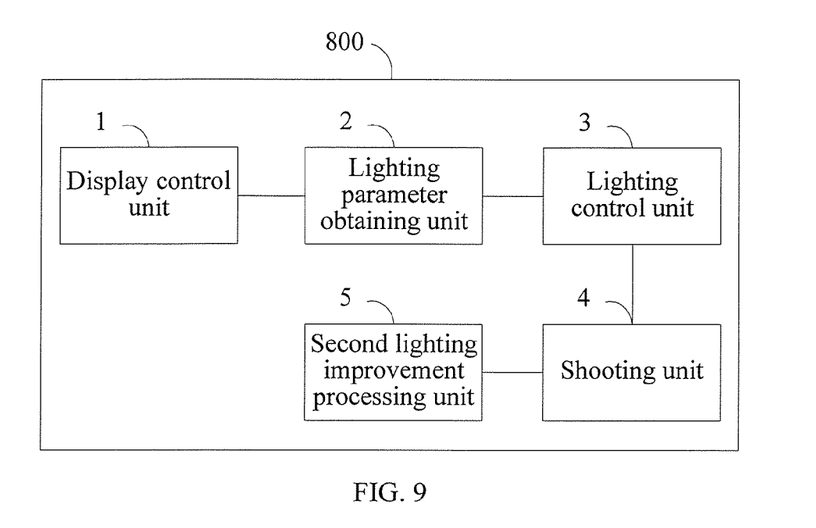
FIG. 9 is another schematic structural diagram of a shooting apparatus according to an embodiment of the present invention.

In another embodiment of the present invention, referring to FIG. 9, the shooting apparatus 800 in all the foregoing embodiments may further include:

a second lighting improvement processing unit 5, configured to perform lighting improvement processing on the shot image.

Refer to the foregoing description in this specification for details, which are not described herein again.

Figure 10:
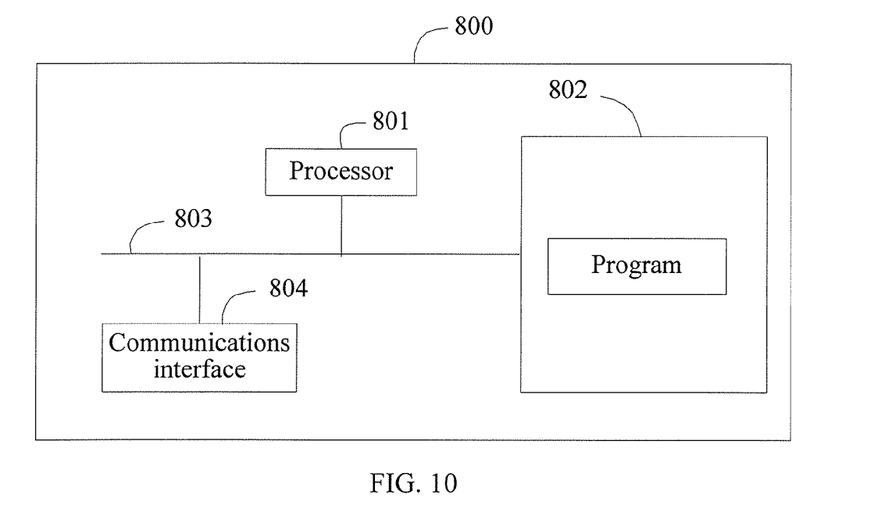
FIG. 10 is still another schematic structural diagram of a shooting apparatus according to an embodiment of the present invention.

FIG. 10 shows a hardware structure of the shooting apparatus 800, which may include a processor 801, a memory 802, a bus 803, and a communications interface 804. The processor 801, the memory 802, and the communications interface 804 are connected to each other by using the bus 803. The memory 802 is configured to store a program. Specifically, the program may include program code, and the program code includes a computer operation instruction.

The memory 802 may include a high-speed random access memory (random access memory, RAM for short), and may also include a non-volatile memory (non-volatile memory), for example, at least one disk memory.

The processor 801 may be a general-purpose processor, including a central processing unit (Central Processing Unit, CPU for short), a network processor (Network Processor, NP for short), and the like; and may also be a digital signal processor (DSP), an application-specific integrated circuit (ASIC), a field-programmable gate array (FPGA) or another programmable logical component, a discrete gate or transistor logical device, or a discrete hardware component.

The processor 801 executes the program stored in the memory 802, and is configured to implement the shooting method provided in the embodiments of the present invention, which includes:

after it is detected that a camera is started, instructing a display screen facing a shooting person to display a preview image;

obtaining a preset lighting parameter;

controlling a display screen facing a shot target to provide lighting by using the preset lighting parameter; and shooting an image according to a shooting instruction.

In addition, the shooting apparatus 800 can also complete other steps involved in the shooting method introduced in the method part of this specification, and substeps of the steps, and details are not described herein again.

In the present invention, the CPU and the memory may be integrated into a same chip, and may also be two independent components.

Correspondingly, the embodiments of the present invention further claims protection for a terminal, where the terminal may at least include a display screen, a camera, and the shooting apparatus described in all the foregoing embodiments.

The embodiments in this specification are described in a progressive manner. Each embodiment focuses on description of a difference from other embodiments. For same or similar parts in the embodiments, reference may be made to each other.

With reference to the embodiments disclosed in this specification, the steps of the methods or algorithms may be directly implemented by hardware, a software module executed by a processor, or a combination thereof. The software module may be configured in a random access memory (RAM), memory, a read-only memory (ROM), an electrically programmable ROM, an electrically erasable programmable ROM, a register, a hard disk, a removable disk, a CD-ROM, or a storage medium in any other form known in the art.

The foregoing descriptions of the disclosed embodiments help a person skilled in the art implement or use the present invention. Various modifications to the embodiments are obvious to a person skilled in the art, and general principles defined in this specification may be implemented in other embodiments without departing from the spirit or scope of the present invention. Therefore, the present invention is not limited to the embodiments described in this specification but subject to the widest scope consistent with the principles and novelty disclosed in this specification.

What is claimed is:

1. A shooting method, comprising:
    after detecting a camera is started, instructing a display screen facing a shooting person to display a preview image;
    obtaining a preset lighting parameter;
    controlling a display screen facing a shot target to provide lighting by using the preset lighting parameter,
        wherein the display screen facing the shooting person and the display screen facing the shot target are a same display screen, and the display screen comprises a display area for displaying the preview image and a lighting area for providing lighting by using the preset lighting parameter,
        wherein the display area comprises a first display area and a second display area that is used to be contrasted with the first display area, a true image collected by the camera is displayed in the first display area, and a simulated image is displayed in the second display area, and
        wherein the true image is an image collected by the camera in a scenario in which the display screen does not provide lighting by using the preset lighting parameter, and the simulated image is a simulation of an image collected in a scenario in which the display screen provides lighting by using the preset lighting parameter; and
    shooting an image according to a shooting instruction.

2. The method according to claim 1, wherein obtaining a preset lighting parameter comprises:
    obtaining the preset lighting parameter when shooting the image according to the shooting instruction.

3. The method according to claim 1, wherein the preset lighting parameter also comprises at least one of a backlight color value a color temperature value, and a backlight brightness value.

4. The method according to claim 1, wherein the simulated image is a simulation of an image collected in a scenario in which the display screen provides lighting by using the preset lighting parameter.

5. The method according to claim 1, wherein the simulated image is an image obtained after lighting improvement processing is performed on the true image collected by the camera.

6. The method according to claim 1, wherein obtaining a preset lighting parameter is performed after it is determined that ambient light brightness collected by a light sensor is less than a preset brightness threshold.

7. The method according to claim 6, wherein before obtaining a preset lighting parameter, the method further comprises:
    setting the lighting parameter according to the collected ambient light brightness.

8. The method according to claim 1, wherein the method further comprises:
    when a distance between a shot person and the camera is shorter than a preset distance threshold, prohibiting a flash on a same side as the camera from flashing, wherein the flash on the same side as the camera refers to a flash whose light coverage range is consistent with a scene capturing range of the camera.

9. The method according to claim 1, wherein the method further comprises:
    performing lighting improvement processing on the shot image.

10. The method according to claim 9, wherein the lighting improvement processing comprises at least one of the following:
    improving overall brightness of the image, enhancing an image contrast ratio, and image composition.

11. A shooting apparatus, comprising:
    a display control unit, configured to: detect a camera is started, and instruct a display screen facing a shooting person to display a preview image;
    a lighting parameter obtaining unit, configured to obtain a preset lighting parameter;
    a lighting control unit, configured to control a display screen facing a shot target to provide lighting by using the preset lighting parameter obtained by the lighting parameter obtaining unit,
        wherein the display screen facing the shooting person and the display screen facing the shot target are a same display screen, and the display screen comprises a display area for displaying the preview image and a lighting area for providing lighting by using the preset lighting parameter,
        wherein the display area comprises a first display area and a second display area that is used to be contrasted with the first display area, a true image collected by the camera is displayed in the first display area, and a simulated image is displayed in the second display area, and
        wherein the true image is an image collected by the camera in a scenario in which the display screen does not provide lighting by using the preset lighting parameter, and the simulated image is a simulation of an image collected in a scenario in which the display screen provides lighting by using the preset lighting parameter; and
    a shooting unit, configured to shoot an image according to a shooting instruction.

12. The apparatus according to claim 11, further comprising:
    a first lighting improvement processing unit, configured to perform lighting improvement processing on the true image collected by the camera, wherein the simulated image is an image obtained after the first lighting improvement processing unit performs lighting improvement processing.

13. The apparatus according to claim 11, wherein the lighting parameter obtaining unit obtains the preset lighting parameter after it is determined that ambient light brightness collected by a light sensor is less than a preset brightness threshold.

14. The apparatus according to claim 13, further comprising:
   a setting unit, configured to: before the lighting parameter obtaining unit obtains the preset lighting parameter, set the lighting parameter according to the ambient light brightness collected by the light sensor.

15. The apparatus according to claim 11, further comprising:
   a prohibiting unit, configured to: when a distance between a shot person and the camera is shorter than a preset distance threshold, prohibit a flash on a same side as the camera from flashing, wherein the flash on the same side as the camera refers to a flash whose light coverage range is consistent with a scene capturing range of the camera.

* * * * *